(12) United States Patent
Hansen et al.

(10) Patent No.: US 7,930,246 B2
(45) Date of Patent: Apr. 19, 2011

(54) METHOD AND SYSTEM FOR TRANSFERRING STORED VALUE

(75) Inventors: Kurt L. Hansen, Castle Rock, CO (US); Joseph Cachey, III, Denver, CO (US)

(73) Assignee: The Western Union Company, Englewood, CO (US)

( * ) Notice: Subject to any disclaimer, the term of this patent is extended or adjusted under 35 U.S.C. 154(b) by 0 days.

(21) Appl. No.: 12/642,526

(22) Filed: Dec. 18, 2009

(65) Prior Publication Data

US 2010/0100478 A1    Apr. 22, 2010

Related U.S. Application Data

(62) Division of application No. 09/955,747, filed on Sep. 18, 2001.

(51) Int. Cl.
*G06Q 40/00* (2006.01)
(52) U.S. Cl. ............................. 705/39; 705/35
(58) Field of Classification Search .................. 705/35, 705/39
See application file for complete search history.

(56) References Cited

U.S. PATENT DOCUMENTS 6,439,456 B1 * 8/2002 Bansal et al. ................. 235/379
6,473,500 B1 * 10/2002 Risafi et al. .............. 379/144.01

OTHER PUBLICATIONS

Western Union Launches P2P Internet Payment Service EFT Report. New York: Sep. 20, 2000. vol. 23, Iss. 19; p. 1.*
EDS invests in wireless banking services for the mobile set Brad Shewmake. InfoWorld. San Mateo: Apr. 24, 2000. vol. 22, Iss. 17; p. 24, 1 pgs.*

* cited by examiner

*Primary Examiner* — Lalita M Hamilton
(74) *Attorney, Agent, or Firm* — Kilpatrick Townsend & Stockton LLP

(57) ABSTRACT

A method and system are provided for transferring value from a value provider. A request initiated by a value owner to transfer value from the value provider to a recipient is received. An exchange provider receives the value in accordance with the request. The exchange provider includes a processor that converts the received value into a converted form. The converted value is then transmitted to the recipient by the exchange provider.

7 Claims, 4 Drawing Sheets

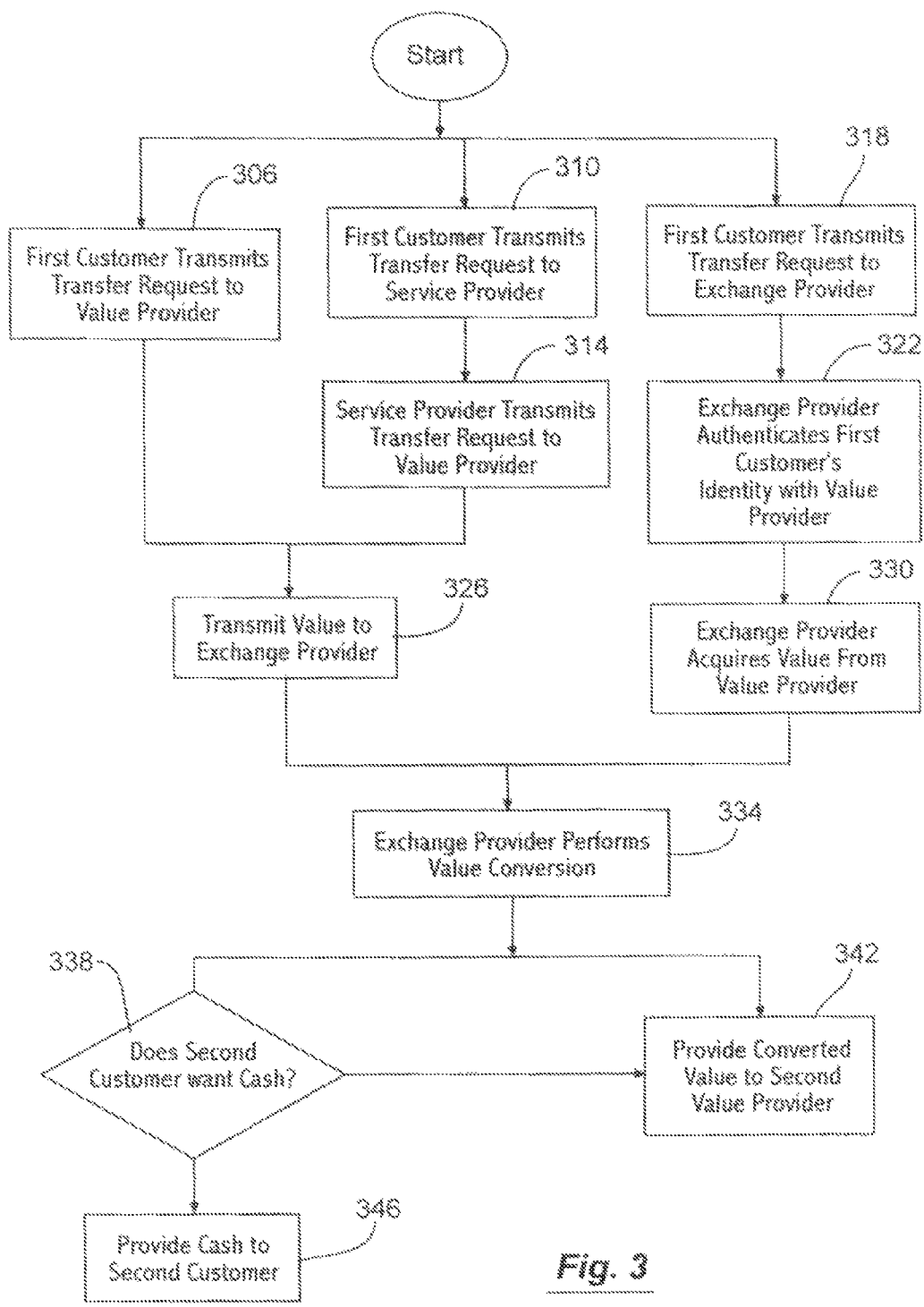

METHOD AND SYSTEM FOR TRANSFERRING STORED VALUE

BACKGROUND OF THE INVENTION

The invention relates to a system and method for transferring stored value.

As electronic systems have continued to develop in recent decades, there has generally been an increase in the types of value that may be used by customers. For example, in addition to having monetary value stored electronically in their bank accounts, many customers now also have value stored in other forms, including nonmonetary forms such as cell-phone minutes or travel points. While such value may, in principle, be transferable, there has generally been no simple way to effect a transfer efficiently. This may particularly be the case for a transfer in which it may be desired to convert value from one form into another.

One existing effort to simplify the transfer of value makes use of a smart card, which has sometimes been described as containing "digital cash." A smart card is typically a plastic card with an embedded microchip that can be loaded with data and then periodically refreshed. The microchip may thus be programmed to include a certain level of monetary value, which can then be used to execute transactions. Smart cards are often designed to be inserted into a slot to be read by a special reader, although they may also be configured to be read at a distance using a Wireless Application Protocol ("WAP"), typically at infrared wavelengths. Recently, some suggestion has been made that smart cards holding monetary value may be incorporated into other devices, such as in mobile phones in a manner similar to the existing Security Identity Modules ("SIM").

Such developments, however, do not address the conversion of stored values as part of a transfer.

BRIEF SUMMARY OF THE INVENTION

Thus, embodiments of the invention provide methods and systems for transferring value from value providers. Such value may generally be categorized as monetary value or as nonmonetary value, which includes, for example, mobile-phone minutes or travel points. As part of the transfer of the value, it undergoes a conversion. Such a conversion may be from one value type into a new value type and/or may include a transaction fee assessed as part of the service of performing the transfer.

Generally, the transfer of value is effected by an exchange provider. The exchange provider is configured to receive the value from the value provider, to convert it into a new form, and then to transmit the converted value to a recipient. The exchange provider includes a processor, an input device, an output device, and a local database; it may also be provided with access to one or more external databases. The value is initially received from the value provider with the input device. It is then converted into the new form by the processor, accessing data as necessary from the local and/or external databases to perform the conversion. The output device is then used to transmit the converted value to the recipient.

In some embodiments, the request initiated by the value owner is received by the value provider before it is communicated to the exchange provider. In such embodiments, no authentication of the request is needed because the value provider is holding the value for the benefit of the value owner and has access to all pertinent records. In other embodiments, the request initiated by the value owner is instead communicated directly to the exchange provider. In such embodiments, the request is first authenticated with the value provider to verify the identity of the value owner and to verify that adequate value is being held for the benefit of that value owner.

The converted value may be transmitted to the recipient in a number of different ways. For example, in one embodiment, the recipient is a second value provider that will hold the converted value for the benefit of a new value owner. In such an instance, the exchange provider may issue an identifier, such as a personal identification number, that may be communicated to the new value owner. With this identifier, the new value owner may access the converted value with the second value provider. In an alternative embodiment, the recipient is an individual and the converted value may be issued directly to that individual in the form of cash or some monetary instrument.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIG. 3 is a flow diagram illustrating various embodiments of the invention.

DETAILED DESCRIPTION OF THE INVENTION

Embodiments of the invention are directed to a method and system for transferring stored value. As used herein, "value" is intended to be interpreted broadly and refers generally to anything having worth that is capable of numerical definition. Value may be monetary, in which case it is directly correlated with a specific currency worth, or may be nonmonetary. The definition of "value" also includes an ability to acquire a debt, which may itself be monetary or nonmonetary, and an expectation of monetary or nonmonetary value. Monetary value includes cash or a cash equivalent (collectively referred to herein as such as a check or money order. Examples of monetary value also include bank accounts, credit accounts, debit accounts, smart-card accounts, bill payments, government payments, charitable contributions, gift certificates, etc. Examples of nonmonetary value include mobile-phone minutes, travel points from mileage programs, affinity programs, investment shares, electronic gift cards, etc. Such examples are provided merely for purposes of illustration and are not intended to be limiting. The character of a specific value provider will thus depend on the type of value that it provides. Examples of value providers include, without limitation, banks, credit unions, mobile-phone service providers, mobile-phone service aggregators, airlines, internet operators, etc.

Figure 1A:
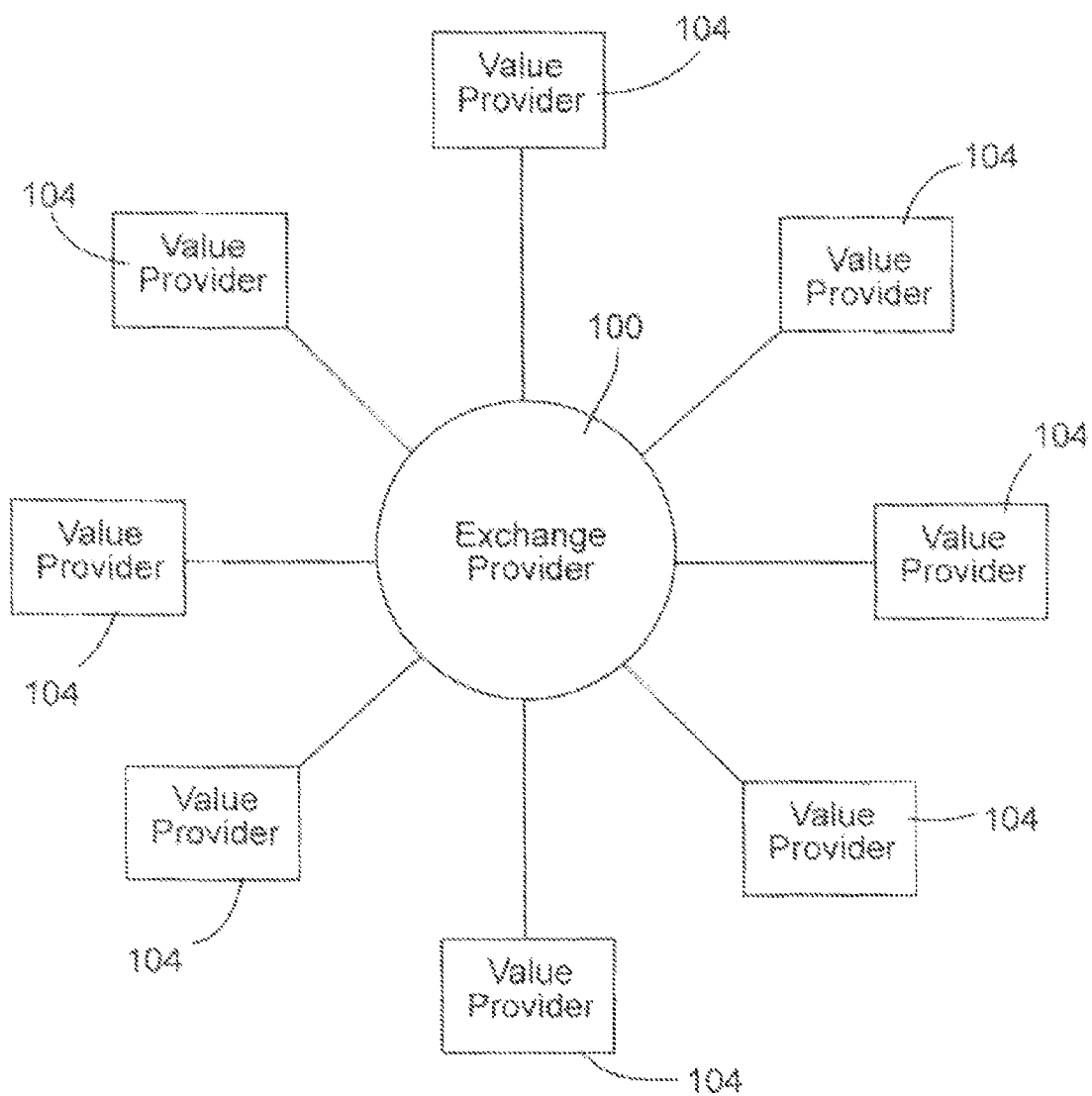
FIG. 1A is a schematic illustration of how an exchange provider interfaces with a plurality of value providers.

Records of value are, now routinely kept electronically. The method and system in one embodiment thus contemplates that a plurality of value providers 104 are in communication with an exchange provider 100, as shown schematically in FIG. 1A. The communication connections between the individual value providers 104 and the exchange provider 100 are shown with solid lines. Each of the value providers will typically have different types of value stored for customers. In some instances, two or more value providers 104 may actually, provide the same types of value, but because of differences between the value providers 104, value stored with them is not readily transferable. For example, where two value providers 104 are mobile-phone service providers, non-monetary value may be stored as discrete minutes of time. Such time-based units, even though both registered as minutes of time, may not be readily transferable from one service provider to another.

The exchange provider 100 functions by accepting stored value from one of the value providers 104 in response to an instruction by a first customer to transfer stored value to a second customer. Typically, the first customer is the owner of the value to be transferred. The first and second customers may or may not be customers of the same value provider 104. The exchange provider 100 acts on the transfer request by performing a conversion through a predetermined exchange rate, which will in general account for any fee charged by the exchange provider 100. While the conversion will generally be between different types of value, in one embodiment the conversion is between the same or similar value types. The exchange provider 100 then provides the converted value to a value provider 104. Generally, the two value providers 104 involved in the transaction will be different, but in some embodiments discussed in further detail below they may be the same.

Figure 1B:
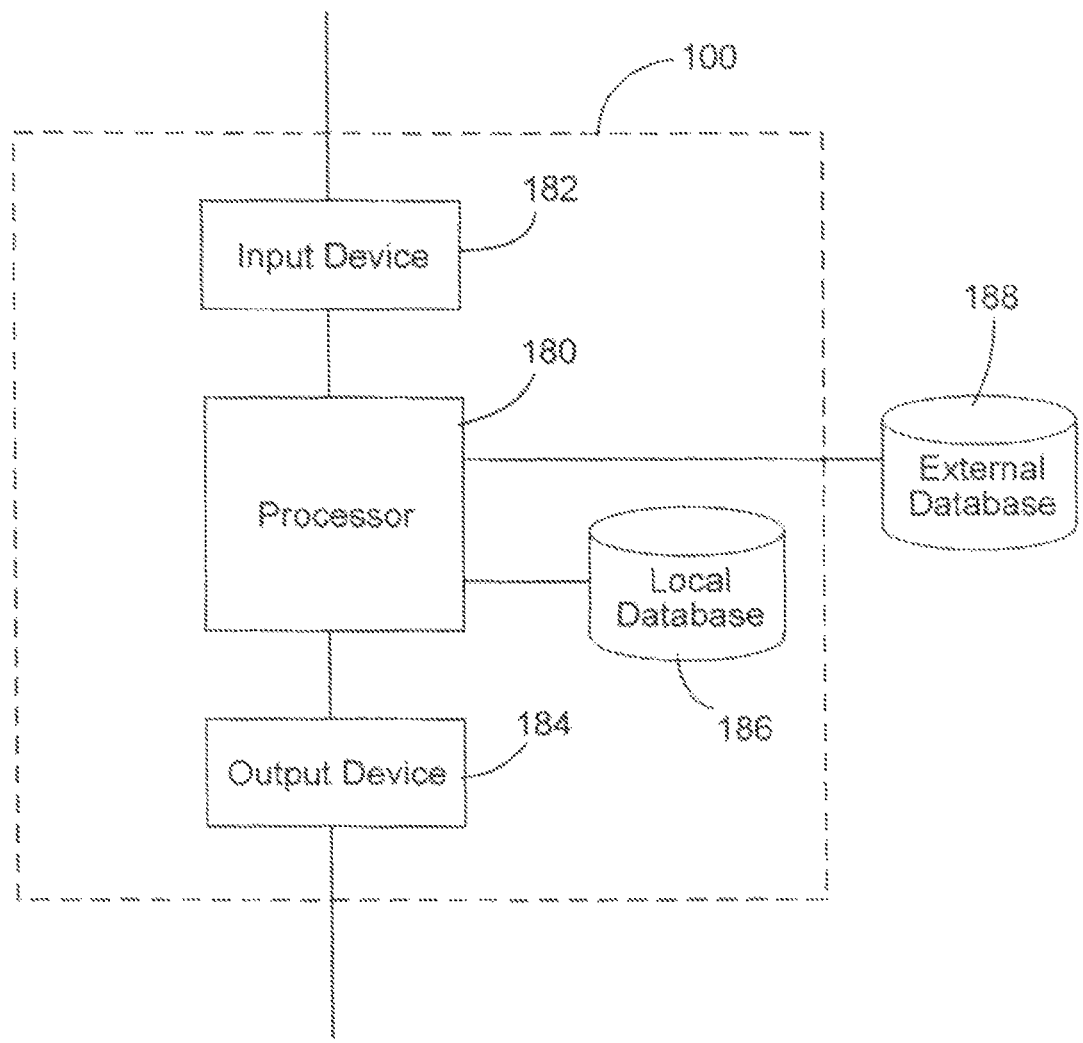
FIG. 1B is a more detailed schematic illustration of the structure of the exchange provider.

In FIG. 1B a schematic overview is provided for one embodiment of the exchange provider 100. The exchange provider 100 comprises a processor 180 in communication with an input device 182 and an output device 184. The processor 180 is configured to accept data from the input device 182, such as value that is to be transferred or, in some instances, a request to transfer data from a value provider 104. The processor 180 is also configured to provide data to the output device 184, such as value that has been converted. In performing the conversion from one form to another, the processor 180 may rely on information stored on a local database 186 and on external databases 188. The local database 186 will typically store administrative information, such as that needed to identify various value providers 104 and the types of value they provide, as well as customer information. The local database 186 may also store fixed conversion rates between different types of value, including the fee charged for the transfer and conversion. The external databases 188 may be used generally to access any relevant information not maintained by the exchange provider 100. For example, an external database 188 may comprise a database maintained by one of the value providers 104, so that the exchange provider 100 can access changes in worth of that provider's value type in order to set conversion rates.

The input and output devices 182 and 184 may be configured for a variety of types of interaction with the exchange provider 100. For example, the input device 182 may comprise an interactive voice response ("IVR") unit so that a customer may use provide instructions by voice that are interpreted with voice-recognition techniques. Alternatively, the input device 182 may comprise a data entry unit manned by a customer-service representative who obtains instructions through live interaction with the customer. In another embodiment, the input device 182 may comprise an internet connection so that the customer may enter instructions via an interact web site. In a further embodiment, the input device may comprise a unit for recognized dual-tone multifrequency ("DTMF") signals so that a touch-tone telephone may be used for entering instructions. In another embodiment, the input choice 182 may be a station accessible by the customer and configured to accept a Wireless Application Protocol signal.

Figure 2A:
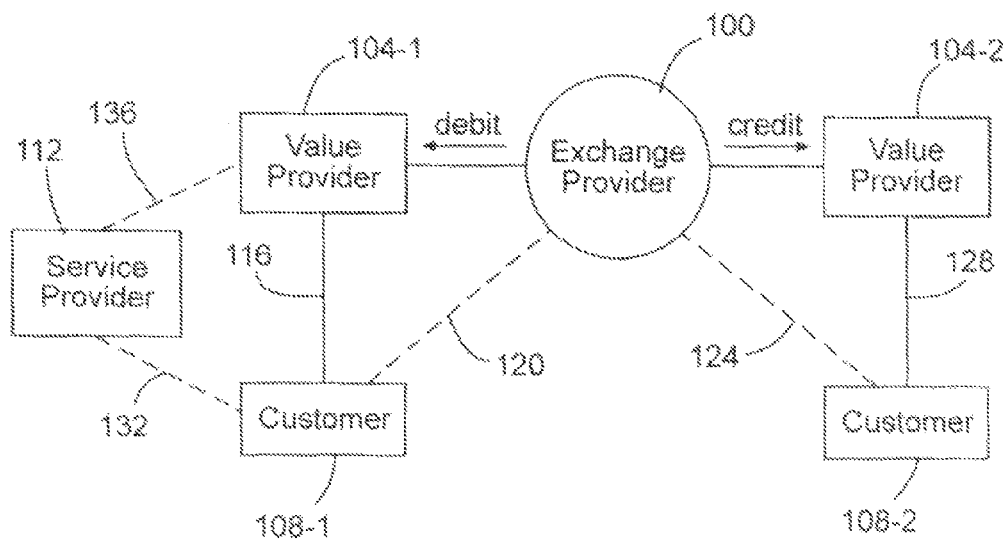
FIG. 2A is a schematic illustration of how value owners and customers interact, with the exchange provider and with value providers.
Figure 2B:
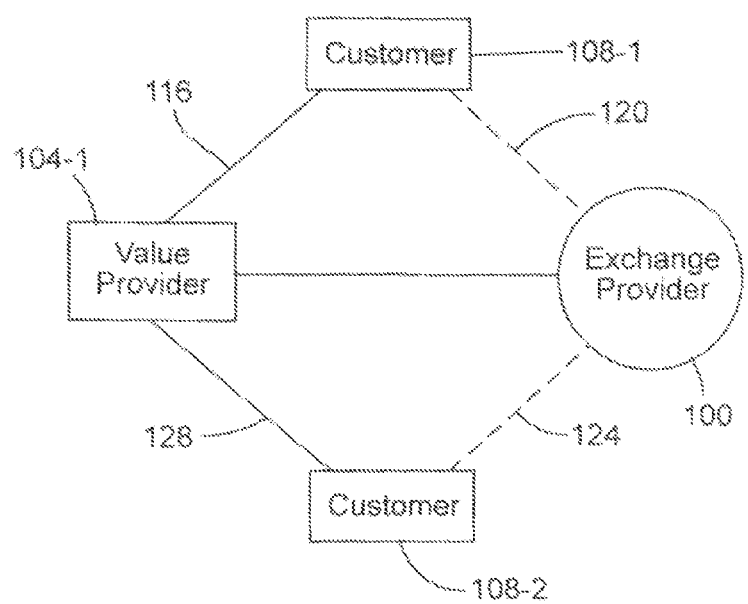
FIG. 2B is a schematic illustration of an embodiment having only a single value provider.

FIG. 2A illustrates schematically how two specific customers 108-1 and 108-2 may interact to execute a transaction to transfer value from a first value provider 104-1 to a second value provider 104-2 that functions as the recipient. For purposes of illustration, a transaction is considered in which the first customer 108-1 is a customer of the first value provider 104-1 and is the value owner of the value to be transferred. FIG. 2B shows a special case in which both customers 108-1 and 108-2 are customers of the first value provider 104-1 and is discussed below. FIG. 3 shows how a value transfer is effected for different embodiments, so the following discussion of such embodiments makes reference simultaneously to the structural diagrams in FIGS. 2A and 2B and the flow diagram in FIG. 3.

In addition to the different ways in which the initial transfer request may be made (e.g., IVR, internet, DTMF, etc.), the first customer 108-1, i.e. the value owner, may additionally be able to communicate that request to one of at least three different entities. Generally any of the ways described to communicate with the input device of the exchange provider 100 may also be used alternatively to communicate with any of the three entities with a similar input device. Thus, in a first embodiment, the first customer 108-1 communicates the transfer request directly at block 306 along communication path 116 to the first value provider 104-1, which has value stored for the benefit of the first customer 108-1. In a related but alternative embodiment, a service provider 112 may exist to relieve the first customer 108-1 from having to interact directly with the first value provider 104-1. Accordingly, in this alternative embodiment, the first customer 108-1 instead communicates the transfer request at block 310 along communication path 132 to the service provider 112. The service provider 112 then subsequently communicates the transfer request at block 314 along communication path 135 to the first value provider 104-1, perhaps modified in format to be processed more efficiently by the first value provider 104-1.

In either of these two embodiments, the first value provider 104-1 receives a request initiated by one of its customers to transfer value that is being held for the benefit of the first customer 108-1. Typically, the transfer request will specify the amount of value to be transferred and to which second value provider 104-2 it should be transferred. In addition, the transfer request will generally also identify the second customer 108-2, who is ultimately the value owner of the transferred value. Such identification may use personal information, such as the name or Social Security Number of the second customer 108-2, but may alternatively be an identification number generated when the transfer request is initiated that must independently be communicated to the second customer 108-2. Accordingly, in one embodiment the transfer request is encrypted using a public-key encryption standard.

In addition, the first customer 108-1, when initiating the request, may be required to supply information to satisfy the first value provider 104-1 of his identity. Such security may be provided to the system in a number of different ways. For example, the first customer 108-1 may be required to provide a personal identification number ("PIN") or may be required to allow a' comparison of stored biometric information. Such information may be derived, for example, from a voice pattern, fingerprint, facial feature, retinal structure, or any other biometrically derived characteristic, of the first customer 108-1.

After the first value provider 104-1 receives the transfer request, it executes a portion of the transfer request by debiting the appropriate value that was being stored for the first customer's 108-1 benefit. That value is then transmitted to the exchange provider 100 at block 326, together with the remainder of the transfer request, specifying the desired type of conversion and identifying the recipient.

In an alternative embodiment, the first customer 108-1 avoids all intermediaries and transmits the transfer request along communication path 120 directly to the exchange provider 100 at block 318. Since the first customer's 108-1 value provider 104-1 does not actually receive the transfer request, the exchange provider 100 performs authentication with the first value provider 104-1 at block 322. Such authentication generally includes verifying the identity of the first customer 108-1 with the first value provider 104-1 and verifying that sufficient value is being held for the benefit of the first customer 108-1 to cover the requested transaction. After authenticating, the exchange provider 100 issues a debit to the first value provider 104-1 for the transfer amount.

Regardless of how the first customer 108-1 initiates the transfer request, at block 334, the exchange provider 100 has acquired value from the first value provider 104-1 consistent with the transfer request. At block 334, this value is converted in accordance with the transfer request. Such conversion takes account not only of the relative worth in the original and new value types, but also any transaction fee charged by the exchange provider.

In one embodiment, the exchange provider then simply issues a credit to the specified second value provider 104-2 at block 342. This value is then available to the second customer 108-2 in accordance with the usual business practices of the second value provider 104-2. For example, if the second customer 108-2 is already a registered customer of the second value provider 104-2, the credited value may simply be added to an existing account and held for the benefit of the second customer 108-2 as a new value owner, who may access the new credited value with communication path 128. Alternatively, the credited value may simply be held by the second value provider 104-2 until the second customer 108-2 identifies herself in accordance with the identification criterion that accompanied the original transfer request.

In another embodiment, the exchange provider 100 may allow for an exit of nonmonetary value, typically in the form of cash or another type of monetary value. Thus, at block 338 a determination is made whether the second customer 108-2 would prefer to have the transferred value converted to cash, perhaps with a supplementary transaction fee. If the second customer 108-2 does not indicate that the value should be exited, the value is credited to the second value provider 104-2 as described above. If the second customer 108-2 does request that the value be exited, such as over communication path 124 with the exchange provider, cash is provided at block 346.

The ability to exit value is particularly useful in the special case where the first and second value providers are the same. This special case is illustrated schematically in FIG. 2B, which may be viewed as a folded version of the general case shown in FIG. 2A. In this embodiment, both customers 108-1 and 108-2 may be customers of the same value provider 104-1. While it may be possible for a simple transfer of value to be performed internally within the value provider 104-1 without conversion, the value provider 104-1 is not generally equipped for exiting value in accordance with requests from its customers. Thus, in response to a transfer request from the first customer 108-1, nonmonetary value is provided to the exchange provider 100 as before at block 326 or block 330 depending on how the request is initiated. This nonmonetary value is then exited at block 346 to the second customer in the form of cash or other monetary value.

In some embodiments, the transmission or exchange of value at block 326 or at block 330 may be established to be recurrent. In other embodiments, the transfer of value to the second customer 108-2 is a one-time staged event. In embodiments where transfer is to be recurrent, the transfer request provided by the first customer 108-1 at block 306, 310, or 318 includes an instruction that a specified amount of value is to be transferred to the second customer 108-2 at certain intervals. The value amount may be fixed or may be variable, and the transfer times may be regularly spaced or may be irregularly spaced.

Example No. 1

The functioning of embodiments of the invention may be clarified with examples that are intended only to be illustrative and not limiting. For example, suppose A has accumulated mobile-phone minutes with his mobile-phone service provider and wishes to transfer their value in the form of frequent-flier miles to B's airline account. A enters a request through his mobile phone to his service provider to effect the transfer. The mobile-phone service provider transfers the mobile-phone minutes to the exchange provider 100, which then converts them into the appropriate frequent-flier miles at a predetermined exchange rate. The frequent-flier miles are then transferred to the airline, where they are credited to B's airline account.

Example No. 2

In a second example, C wishes to pay a debt to D using his mobile-phone minutes in cash. In this example, C notifies the exchange provider 100 on the exchange provider's web site that it should collect value from C's mobile-phone service provider and issue cash to D. The exchange provider 100 verifies the existence of C's account with the mobile-phone service provider and debits the desired number of minutes upon satisfactory authentication. The exchange provider 100 supplies C with an identification number as part of confirming the transfer request on its web site, and C notifies D that it may use the identification number to receive cash from the exchange provider. Upon presenting herself at an office of the exchange provider 100 with the identification number, the cash is issued to D. The mechanics of this example may operate equivalently whether or not D is a customer of C's mobile-phone service provider.

Example No. 3

In a third example, E wishes to establish an arrangement so that her daughter F may have regular access to mobile-phone minutes, perhaps when F leaves home to attend a university or college. While E does not currently have enough mobile-phone minutes to provide F for, say, an entire year, E does expect to be accumulating mobile-phone minutes regularly over that period. Accordingly, E arranges for periodic monthly transfers of a prescribed number of mobile-phone minutes to be transferred from E's mobile-phone service provider to F's mobile-phone service provider. This example illustrates Ian instance where the same valuation is transferred and illustrates an example of recurring transfers.

Various alternatives and equivalents will be evident after reading the foregoing description to those of skill in the art. For example, while the transfer of value to and from the exchange provider 100 has been described as being generally simultaneous, the exchange provider 100 may alternatively acquire different types of value in bulk. For example, the exchange provider 100 may seek to purchase mobile-phone minutes in bulk on the market, which it then stores in its local database 186 ready to use as needed for transfers as they are requested. In another alternative embodiment, the exchange provider 100 and value provider 104 may agree to transfer value only in bulk units. In such an embodiment, the value provider 104 only transfers the value once a predetermined level of transactions have been reached, e.g. N units of value.

Accordingly, it will be recognized that various modifications, alternative constructions, and equivalents may be used without departing from the spirit of the invention and that the above description should not be taken as limiting the scope of the invention, which is defined in the following claims.

What is claimed is:

1. A method for transferring value from a stored value account to cash, the method comprising:
   receiving a request initiated by a requestor using a mobile device via a web browser using a Wireless Application Protocol signal to transfer at least some of a stored value maintained by a value provider, wherein the request is received at an exchange provider having a computer processor and a database;
   processing the request by the processor to generate an identifier, the identifier being associated with an amount of cash to be transferred to a recipient upon presentation of the identifier, the amount of cash being based on at least a portion of the stored value;
   transmitting, via the Wireless Application Protocol signal to the mobile device's browser, the identifier to the requestor;
   receiving at the exchange provider the identifier supplied by the recipient;
   confirming the identifier in order to supply the recipient with the amount of cash; and
   presenting, at an office of the exchange provider, the identifier to receive at the office the amount of cash.

2. The method of claim 1, wherein the stored value comprises a nonmonetary value.

3. The method of claim 1, wherein the exchange provider verifies the existence of the requestor's account and debits the account for the value to be transferred.

4. A method for transferring value between two financial accounts that are associated with mobile devices, the method comprising:
   receiving a request from a sender mobile device via a web browser using a Wireless Application Protocol signal to transfer value maintained in a sender account of a value provider to a recipient account associated with a recipient mobile device;
   transmitting, via the Wireless Application Protocol signal to the sender's mobile device's browser, a identifier to the recipient;
   based on the identifier, processing the request with a computer system of an exchange provider, to debit the sender account and to produce instructions to credit the recipient account, wherein the value in the recipient account is accessible using the recipient mobile device; and
   presenting the identifier stored on the recipient's mobile device at an office of the exchange provider to receive at the office the credit to the recipient's account in cash.

5. The method of claim 4, wherein the value provider comprises a first mobile phone service provider, and wherein the recipient account is maintained by a second mobile phone service provider.

6. The method of claim 4, further comprising converting the value from the sender account to another type of value before crediting the recipient account.

7. The method of claim 5, wherein the first mobile phone service provider and the second mobile phone service provider are the same.

* * * * *

UNITED STATES PATENT AND TRADEMARK OFFICE
CERTIFICATE OF CORRECTION

| | | |
|---|---|---|
| PATENT NO. | : 7,930,246 B2 | Page 1 of 1 |
| APPLICATION NO. | : 12/642526 | |
| DATED | : April 19, 2011 | |
| INVENTOR(S) | : Kurt L. Hansen et al. | |

It is certified that error appears in the above-identified patent and that said Letters Patent is hereby corrected as shown below:

Column 2, line 54, please insert -- "cash"), -- after herein as.

Column 4, line 3, please delete "interact", and insert -- internet --.

Column 4, line 66, please delete "a'", and insert -- a --.

Column 6, line 66, please delete "Ian", and insert -- an --.

Signed and Sealed this
Twenty-eighth Day of June, 2011

David J. Kappos
*Director of the United States Patent and Trademark Office*